United States Patent
Zejda et al.

(10) Patent No.: US 11,003,429 B1
(45) Date of Patent: May 11, 2021

(54) COMPILE-TIME SCHEDULING

(71) Applicant: Amazon Technologies, Inc., Seattle, WA (US)

(72) Inventors: Jindrich Zejda, Saratoga, CA (US); Jeffrey T. Huynh, San Jose, CA (US); Tobias Joseph Kastulus Edler von Koch, Austin, TX (US); Drazen Borkovic, Los Altos, CA (US); Taemin Kim, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/266,915

(22) Filed: Feb. 4, 2019

(51) Int. Cl.
  *G06F 8/41* (2018.01)
  *G06F 16/901* (2019.01)
  *G06F 15/80* (2006.01)

(52) U.S. Cl.
  CPC ............ *G06F 8/445* (2013.01); *G06F 8/4441* (2013.01); *G06F 15/8046* (2013.01); *G06F 16/9024* (2019.01)

(58) Field of Classification Search
  CPC ... G06F 8/445; G06F 15/8046; G06F 16/9024
  USPC ......................................................... 717/140
  See application file for complete search history.

(56) References Cited

U.S. PATENT DOCUMENTS

| | | | |
|---|---|---|---|
| 8,555,281 B1* | 10/2013 | van Dijk | G06F 9/4881 718/100 |
| 2010/0122105 A1* | 5/2010 | Arslan | G06F 30/33 713/500 |
| 2013/0097606 A1* | 4/2013 | Coombe | G06F 9/4887 718/102 |

* cited by examiner

*Primary Examiner* — Jae U Jeon
*Assistant Examiner* — Bradford F Wheaton
(74) *Attorney, Agent, or Firm* — Kilpatrick Townsend & Stockton LLP

(57) ABSTRACT

Scheduling of the operations of an integrated circuit device such as a hardware accelerator, including scheduling of movement of data into and out of the accelerator, can be performed by a compiler that produces program code for the accelerator. The compiler can produce a graph that represents operations to be performed by the accelerator. Using the graph, the compiler can determine estimated execution times for the operations represented by each node in the graph. The compiler can schedule operations by determining an estimated execution time for set of dependent operations that depend from an operation. The compiler can then select an operation that has a shortest estimated execution time from among a set of operations and which has a set of dependent operations that has a longest estimated execution time as compared to other sets of dependent operations.

20 Claims, 13 Drawing Sheets

500

Receiving an input data set including operations to be performed by an integrated circuit device and dependencies between the operations, wherein the input data set includes an estimated execution time for each of the operations, and wherein the integrated circuit device does not include memory management
502

Computing an estimated execution time for each operation in the input data set, wherein the estimated execution time is based on a model of a respective resource to be used in the execution of each operation
504

Determining a first set of operations in the input data set that are not dependent on other operations in the input data set, wherein the first set of operations will each use a same resource of the integrated circuit device
506

Determining, for each operation of the first set of operations, an estimated execution time of a respective set of dependent operations that depend from each operation, wherein a number of operations in each respective set of dependent operations is less than or equal to a pre-determined limit
508

Determining a first operation from the first set of operations that has a shortest estimated execution time from among the first set of operations and which has a respective set of dependent operations that has a longest estimated execution time from among the respective sets of dependent operations
510

Adding the first operation to a schedule of operations for the integrated circuit device
512

Generating program instructions according to the schedule of operations
514

FIG. 5

COMPILE-TIME SCHEDULING

BACKGROUND

In various examples, hardware accelerators, or acceleration engines, are purpose-built integrated circuit devices for performing a particular set of operations. A computing system can include hardware accelerators for accelerating neural network computations, graphics rendering, or floating point math, among other examples. While the operations performed on a hardware accelerator can be performed by a general purpose processor, using a general purpose processor may be significantly slower. Thus, when a computing system frequently performs computationally intensive operations such as neural network inferences or image processing, the computing system can include dedicated hardware for performing these operations.

Hardware accelerators may be designed to be relatively simple and inexpensive, so that adding an accelerator to a computing device provides a less expensive approach (in terms of dollars and time) than using the general purpose processor. Hardware accelerators may thus lack features commonly found on a general purpose processor, such as features that are difficult to implement, and thus extend the development time of the device, which can increase the overall cost of the device. For example, an accelerator may lack hardware for performing control flow, sophisticated management of local memory (such as caches), or other hardware that may optimize the performance of the accelerator. In these examples, software may perform these functions for the accelerator.

BRIEF DESCRIPTION OF THE DRAWINGS

Various embodiments in accordance with the present disclosure will be described with reference to the drawings, in which:

FIG. 5 includes a flowchart illustrating an example of a process for generating program instructions for an integrated circuit device;

DETAILED DESCRIPTION

Figure 1:
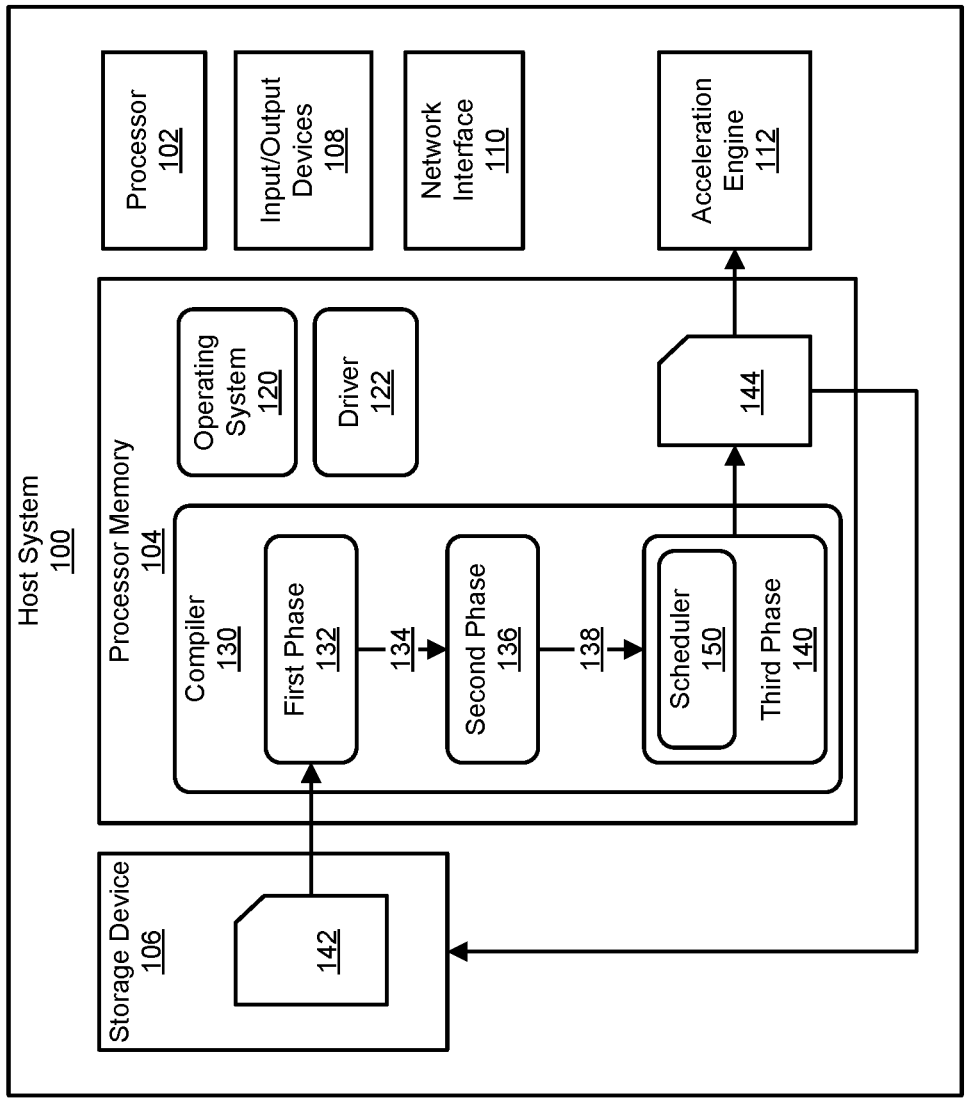
FIG. 1 includes a block diagram illustrating an example of a host system on which a compiler can run.

A hardware accelerator can execute program code, which can determine the computations performed by the accelerator and the data on which the computations are performed. The accelerator can include a local memory, built into the device, for storing input data for computations, intermediate values generated in the course of the computations, and/or the results from computations. The accelerator can approach maximum efficiency when the accelerator's computational engines, also referred to as execution engines, are kept busy as much as possible. For the execution engines to be busy, the data being operated on needs to be available in the local memory, or else the execution engines must wait for the data to be copied into the local memory from elsewhere. Additionally, data being produced by the execution engines may need to be moved out of the local memory so that space is freed for more data.

In many cases, however, an accelerator may not include logic circuitry for scheduling the movement of data into and out of the device's local memory. In contrast, a general purpose processor that includes a local memory, such as a cache, may have logic for managing the cache, which can perform operations such as determining when to load data into the cache, when data should be kept in the cache, and when data can be removed from the cache, among other examples. An accelerator device, however, may lack such memory management logic to save on area cost and development cost, among other considerations.

One solution for managing the movement of data into and out of an accelerator device is for the data movement to be handled in software, such as a driver program. A driver, which can also be referred to as a device driver, is a software program that can provide an interface between user applications and/or an operating system and a hardware component. The driver can perform operations such as, for example, receiving input from a user application and providing the input to an accelerator device for the accelerator device to operate on. The driver can further indicate to the accelerator which computations are to be performed on the input data.

In some examples, a driver program can also manage copying of data into and out of the accelerator, including triggering Direct Memory Access (DMA) engines that will perform the copying of data from host memory to the accelerator's memory, and triggering DMA engines that will copy results from the accelerator's memory to host memory. Using a driver program in this manner, however, may be sub-optimal. In many cases, the driver program executes on a computing system's main processor, also referred to as a host processor. Thus, for the accelerator to inform the driver that the accelerator is ready to accept additional data, or has results ready, the accelerator needs to notify the host processor, for example using an interrupt. The accelerator may then need to wait for the host processor to activate the driver, and for the driver to initiate the data movement. During the waiting, the accelerator may be idle, and thus may be operating inefficiently.

In various examples, scheduling of the operations of hardware accelerator, including scheduling of movement of data into and out of the accelerator, can be performed by a compiler that produces program code for the accelerator. Scheduling can include determining the order in which operations are to be performed by the accelerator. In some instances, the compiler may determine that some operations to be performed by the accelerator's execution engines can be performed concurrently, either because the operations are to be performed by different execution engines, or because the operations do not have an ordering requirement (e.g., the outcome of one operation does not depend on the outcome of another), among other reasons. In the latter case, however, there may be instances where the operations cannot be performed at the same time. For example, the accelerator may have only one execution engine for performing the operations, or if the device has multiple execution engines that can perform the operations, the execution engines may each be occupied working on something else.

A scheduler, or scheduling component, of the compiler can determine when multiple operations require the same resource, and can determine an order in which the accelerator is to perform the operations. In various examples, the scheduler can determine a schedule of operations for the execution engines of the accelerator, where the schedule attempts to keep the execution engines busy as much as possible. To determine the schedule of operations, the scheduler can compute an estimated execution time for each operation. For example, the scheduler can determine an approximate amount of time required for a DMA engine to copy data from host memory into the accelerator, and for an execution engine to perform a set of computations, among other examples. The scheduler can then use the estimated execution times to determine which operations to schedule after others.

In various examples, the operations to be performed by the accelerator can be provided to the scheduler in the form of a data flow graph. The data flow graph can be a directed graph, where the nodes represent operations to be performed by the execution engines of the accelerator, and where connections between the nodes, which can also be referred to as edges, reflect dependencies between the nodes. Using the graph, the scheduler can examine a first level of nodes in the graph, ones that are not dependent on other nodes, and can identify a set of nodes that represent operations to be performed by a same resource (such as an execution engine) of the accelerator. The scheduler can then use the estimated execution times to determine which of the nodes to schedule first. For example, the scheduler can first determine, for each sequence of nodes that depend from each node in the set, an estimated execution time. The scheduler can then select the node that has an estimated execution time that is less than the estimated execution time of the other nodes in the set, and that has a sequence of dependent nodes whose execution time is the longest. In this and other examples, operations that will take a long time to execute can have any operations that they depend on executed first, so that the time-consuming operations need not wait very long to start.

In various examples, the scheduler can also consider the available memory in the accelerator, and can schedule operations that include movement of data into or out of the memory according to various factors. For example, the scheduler can keep track of which operations, represented by the nodes in the graph, will used a particular piece of data as input. In this example, when the data is no longer needed, the scheduler can mark the region of memory that the data occupies as available for storing new data. Also in this example, when the data is needed at multiple nodes, the scheduler can consider whether it will be more time efficient to keep the data in memory or to let the data be overwritten and to re-load the data later. For example, when the data is particularly time consuming to load, then the scheduler may determine to keep the data in the memory. Alternatively, when the approximated time required to load the data is not very long, then the scheduler may determine to let the data be overwritten and to re-load the data when the data is needed again. In these and other examples, the compiler can determine when data needs to be copied to the accelerator and when data can be removed, so that an accelerator that does not include memory management features can be used efficiently.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. The three stages of the compiler 130 can each include one or more components that can perform different steps in the compilation process, as discussed further below. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of locale storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations.

In some examples, the third stage 140 can include a scheduler 150. The scheduler 150 can be a software module that is part of the third stage 140 of the compiler 130. In various examples, the scheduler 150 can receive the output 138 of the second stage 136, which may be a data flow graph. For each node in the graph, the scheduler 150 can compute an estimate of the time required for the acceleration engine 112 to execute the operations represented by the node. Using this information, and the graph, the scheduler 150 can then determine a schedule of operations, which can determine an order for operations that are to be executed by the same execution engine of the acceleration engine 112, where the operations may not otherwise have interdependencies. Examples of models the scheduler 150 may use to compute estimated execution times, and the determination of the schedule of operations, is discussed further below.

In various examples, the output of the scheduler 150 can undergo further processing before or while the compiler 130 generates the instructions upon which the acceleration engine 112 will operate. For example, the third stage 140 can include a dependency resolver, which can examine the dependencies between nodes in the data flow graph and can insert synchronization instructions when a dependency requires the operation of two execution engines to be synchronized. As a further example, the third stage 140 can include modules for verifying that the instructions correctly perform the steps of the program, for verifying that the instructions do not exceed the capabilities of the acceleration engine 112 or the host system 100, and/or for checking whether the instructions may deadlock the acceleration engine 112, among other examples.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
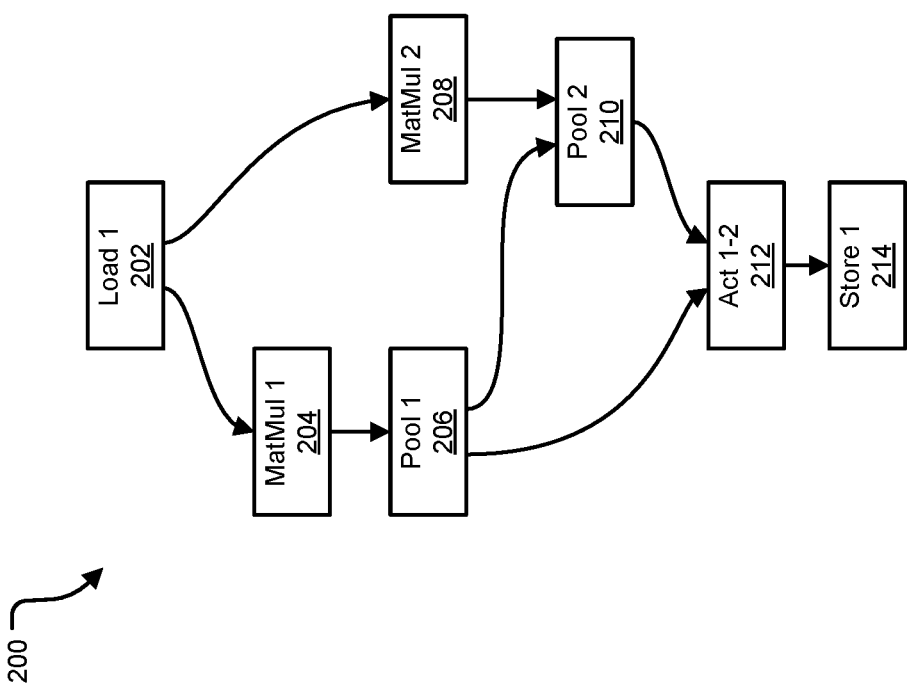
FIG. 2 includes a drawing illustrating an example of a data flow graph.

FIG. 2 includes a drawing illustrating an example of a data flow graph 200. The data flow graph 200 is one example of data that can be generated by a compiler, such as the compiler illustrated in FIG. 1. As discussed with respect to FIG. 1, the data flow graph 200 of FIG. 2 can be an intermediate output of the compiler, and can represent the a set of operations to be performed by an integrated circuit device such as an accelerator. In various examples, the data flow graph 200 can be used by the compiler as an input data set for other components of the compiler, such as a scheduler.

In various examples, the nodes in the data flow graph 200 include operations to be performed by one or possibly multiple execution engines of the integrated circuit device. Operations that can be performed by the integrated circuit device include, for example, movement of data into and out of an internal memory of the integrated circuit device and computations on the data, among other examples. Connections between the nodes, which can also be referred to as edges, illustrated dependencies between the operations at each node. One node is dependent on a previous node when the operations at the later node can only be performed once the operations of the previous node have completed. For example, the later node may use memory space that is also used by the previous node. As another example, the later node may use the output of the previous node as an input. Some dependencies may be within one execution engine, meaning that the operations of the previous node and the later node are both performed by the same execution engine. Some dependencies may be across execution engines, meaning that the operations of the previous node are performed by one execution engine while the operations of the later node are performed by a second, different execution engine.

The example data flow graph 200 of FIG. 2 illustrates a sequence of operations that may be executed by several execution engines. At a first node, labeled "Load 1" 202, data is loaded into the integrated circuit device. The loading of the data can be performed, for example, by a Direct Memory Access (DMA) engine. The data may be copied, for example, from a host memory (also referred to as processor memory) into a memory of the integrated circuit device. The device may have an on-board memory for storing data that is used as input for computations, intermediate data generated during the computations, and/or results of the computations. The "Load 1" 202 node may represent one copy operation or a series of copy operations, as needed to load the input data for the operations at the following two nodes. As illustrated in the example of FIG. 2, one data load operation can load data that is used by more than one subsequent operation.

The "Load 1" 202 node is followed by a first node labeled "MatMul 1" 204 and a second node labeled "MatMul 2" 208, which represent matrix multiplication operations. The matrix multiplications can be performed, for example, by an array of processing engines, which in some examples, can be configured as a systolic array. A matrix multiplication may require many clock cycles to complete, with matrix values being cycled into and out of the array of processing engines until the multiplication is completed. In the illustrated example, the operations at the "Load 1" 202 load data that is used as inputs to operations at the "MatMul 1" 204 and the "MatMul 2" 208 nodes.

The output of the operations at the "MatMul 1" 204 node is used as an input to a node labeled "Pool 1" 206. The operations at the "Pool 1" 206 node can be performed, for example, by a pooling engine, which may be configurable to perform various accumulation operations (e.g., summing, multiplying, averaging, etc.).

The output of the operations at the "MatMul 2" 208 node is used as input to a node labeled "Pool 2" 210. The "Pool 2" 210 node is also dependent on the "Pool 1" 206 node. This may be because operations at the "Pool 2" 210 node use the outputs of the operations at the "Pool 1" 206 node. Alternatively, the dependency may be that operations at the "Pool 1" 206 node write data to a memory location that will be used by the operations at the "Pool 2" 210 for storing results. In any of these situations, the operations at the "Pool 2" 210 node must wait for both the operations at the "MatMul 2" 208 node and at the "Pool 1" 206 to complete before proceeding.

Both the "Pool 1" 206 and "Pool 2" 210 nodes are followed by a node labeled "Act 1-2" 212. "Act," in this example, is short for "Activation," and the node "Act 1-2" 212 describes operations that can be performed using an activation engine, for example. An activation engine can be configured to perform various mathematical functions, such as the identity function, binary step function, bipolar step function sigmoidal function, and/or ramp function, among other examples. In the example of FIG. 2, the operations at the "Act 1-2" 212 require operations at both the "Pool 1" 206 and the "Pool 2" 210 to complete. This may be because the outputs of the "Pool 1" 206 and the "Pool 2" 210 are both used as inputs to the operations at the "Act 1-2" 212 node. Alternatively or additionally, the operations at the "Act 1-2" 212 node may read data from memory locations that are written to by the operations at the "Pool 1" 206 and the "Pool 2" 210 nodes.

The "Act 1-2" 212 node is followed by a node labeled "Store 1" 214. Operations at the "Store 1" 214 can include storing data output by the operations at the "Act 1-2" 212 node to memory outside of the integrated circuit device, such as host memory. Copying of the data can be performed by, for example, a DMA engine.

In various examples, the data flow graph 200 can be input into a scheduler component of a compiler, which can use the information provided by the data flow graph 200 to determine an estimated execution time for the operations at each node. The scheduler can compute the estimated execution times in terms of seconds and/or in terms of clock cycles. The estimated execution times can be based on a model for the hardware that is to execute the operations described in the data flow graph 200. In the example of FIG. 2, the hardware can include a DMA engine for executing load and store operations, an array of processing engines for executing the matrix multiply operations, a pooling engine, and an activation engine. The array of processing engines can be a computational engine that is capable of parallel and sequential computations, such as systolic computations. The pooling and activation engines can be vector-based engines, and may be able to perform computations on sets of related data, such as may be output by the array of processing engines.

To compute the estimated execution time for the operations at the "Load 1" 202 and the "Store 1" 214 nodes, and other nodes that require moving data into or out of the integrated circuit device, the scheduler can use the following equation:

$$t_{mem}=\text{range}[\min\_fixed\_latency+data\_size\times\min\_latency\_per\_byte, \max\_fixed\_latency+data\_size\times\max\_latency\_per\_byte]$$

In the preceding equation, min_fixed_latency and max_fixed_latency are a minimum and maximum time, respectively, required to copy data into or out of the integrated circuit device. This time can include, for example, the time required for a DMA engine to read a DMA descriptor, to decode the instructions described by the descriptor, and/or to add a memory operation to the queue of a memory controller, among other examples. Reading a descriptor can take a variable amount of time, decoding the descriptor can take a fixed amount of time (e.g., a few clock cycles), and queuing the memory controller operation can take a variable amount of time (e.g., tens of clock cycles). The time can further include, for example, waiting for the memory operation to reach the head of the memory controller's queue (a variable amount of time that can depend on the number of other modules in the circuit that are queuing memory controller operations), and/or the amount of time for writing a completion descriptor to a completion queue, once the DMA operation is completed.

The data_size in the above equation is the size of the data being transferred, which can vary for each transfer. For example, the data size for the "Load 1" 202 may be 128 bytes, while for a different load operation the data size may be 64 bytes. The min_latency_per_byte and max_latency_per_byte are a minimum and maximum time, respectively, for transferring one byte. This time can include, for example, the amount of time required for a byte to be read from a source memory, to travel across interconnects between the source memory and the target memory, and to be written into the target memory, for example. The minimum latency may occur when, for example, the bandwidth between the source and target memory is entirely available, and the maximum latency can occur when, for example, the bandwidth is fully utilized.

The equation above produces a range, so that the scheduler can consider different estimated times as needed. For example, when copying data that is going to be used as input data for a computation, the scheduler may consider the minimum execution time because the computation may be able to start before all of the data has been copied to the device, so that, if the copy operation takes longer than the minimum time, the computation is not hampered. As another example, when determining whether memory in the device is available for receiving data, the scheduler may consider the maximum execution time for copying data out of the memory, to ensure that the data is not overwritten by incoming data.

To compute the estimated execution time for the array of processing engines, the scheduler can use the following equation:

$$t_{array}=\text{fixed\_latency}+X1\times C1+Y1\times C2+D1\times C3\pm\text{random\_variation}$$

In the preceding equation, fixed_latency includes time that will be consumed by the array of processing engines each time the array of processing engines performs a computation. This time can include, for example, time needed decode an instruction (which may be a few cycles (e.g., two to four)), to queue an instructions with the array of processing engines, to read input values from memory, to write results to the memory, and/or some number of clock cycles for timing purposes.

The X1 and Y1 variables in the above equation describe shape characteristics of the array of processing engines, and C1 and C2 are constants associated with the shape characteristics. X1, for example, can be a number of rows in the array that are used by a particular computation, and C1 can be the amount of time for inputs and results to move from one row to the next. As a further example, Y1 can be a number of columns in the array that are used by the computation, and C2 can be the amount of time for inputs and results to move from one column to another. As illustrated by these examples, a computation may use fewer than all of the rows and columns of the array of processing engines. As an example, X1 can be equal to 64, Y1 can be equal to 128, and the C1 and C2 can be 2 and 1, respectively. The D1 variable describes a workload being input into the array of processing engines, which may be limited by the size and shape of the array of processing engines. D1, for example, can describe the size of one data set being operated on by the array of processing engines, such as the size of an input feature map. In some examples, the array of processing engines uses two rows when performing a computation on an input feature map, in which case the input feature map must be less or equal to two rows in size. In some examples, the array of processing engines may be able to operate on only one input feature map at a time, in which case the constant C3 is equal to one. In some examples, the array of processing engines can operate on multiple input feature maps at a time, in which case the constant C3 can be greater than one.

The random_variation in the above equation is a random number of milliseconds, nanoseconds, or clock cycles that can be added to the time. In various examples, this accommodates small variations in the amount of time a computation may require, which may be difficult to model precisely. The random_variation may, for example, be a random number between zero and a maximum.

For other execution engines, such as the pooling and activation engines, the scheduler can use the following equation to estimate the time required for an engine to perform an operation:

$$t_{eng} = X10 \times C10 + D10 \times C11 \pm random\_variation$$

In the preceding example, X10 is a shape characteristic of the execution engine and C10 is a constant associated with the shape characteristic. X10, for example, can represent the number of parallel computations that the execution engine will perform for a particular operations, and C10 can be an amount of time each of the parallel computations takes. D10 is a data volume, such as the size of a vector of data being input, and C11 can be an amount of time needed for each input to be processed. The random_variation is a random amount of time that accommodates small variations in the time the execution engine may take to perform an operation. The random_variation may be a random number between zero and a maximum, for example.

The preceding equations are being provided as examples of equations that can be used to estimate the amount of time that an integrated circuit device may require to perform certain operations. For data flow graphs that are different from the data flow graph 200 illustrated in FIG. 2, which may be associated with different integrated circuit devices, other equations can be used that describe the different devices.

FIGS. 3A-3D illustrate examples of data flow graphs, and a procedure that a compiler's scheduler can follow to schedule the operations of the nodes of the graphs.

Figure 3A:
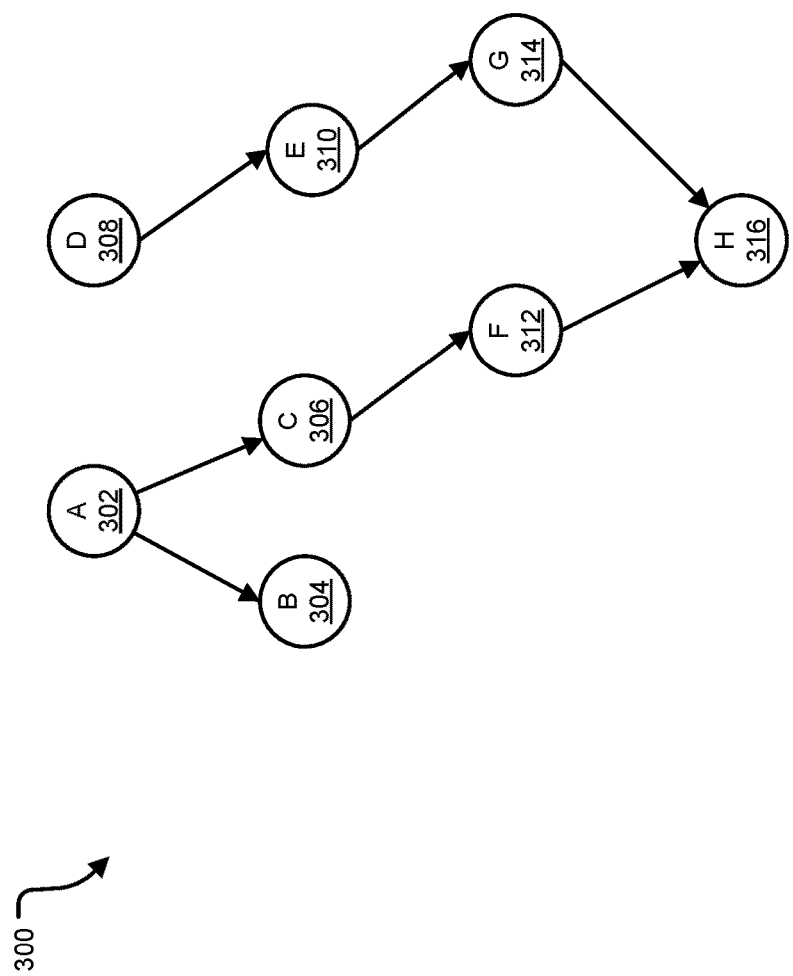
FIGS. 3A-3D illustrate examples of data flow graphs, and a procedure that a compiler's scheduler can follow to schedule the operations of the nodes of the graphs.

FIG. 3A includes a drawing of another example of a data flow graph 300. The data flow graph 300 is one example of data that can be generated by a compiler, such as the compiler illustrated in FIG. 1. For example, the data flow graph 300 of FIG. 3 can be an intermediate output of the compiler, and can represent a set of operations to be performed by an integrated circuit device such as an accelerator. In various examples, the data flow graph 300 can be used by the compiler to perform various operations such as scheduling and synchronization, among other examples.

The drawing of FIG. 3A is a visual representation of the data that may be output by the compiler, and may not represent the literal output of the compiler. For example, the output may be a data structure that includes data objects representing each node, where each data object can include variables that indicate dependencies on other data objects.

In the example of FIG. 3A, the nodes of the data flow graph 300 can represent operations such as copying of data into or out of an integrated circuit device and/or computations to be performed by the integrated circuit device, among other examples. The operations can include ones similar to those illustrated in FIG. 2 and/or can include other operations. The operations can be performed by one executing engine of the integrated circuit device, or by multiple execution engines. The nodes can also be referred to as vertices.

Connections between nodes of the data flow graph 300 indicate dependencies between the operations represented by each node. Two nodes have a dependency when the operations at one node require the operations of another node to be completed before the operations at the first node can start. For example, a later node's operations may use the outputs of a prior node's operations as inputs. As another example, a later node's operations may read a memory location that a prior node's operations use for writing results. As another example, a later node's operations may include writing data to a memory location that contains data that will be read by a prior node's operations.

The example data flow graph 300 of FIG. 3A includes eight nodes, labeled A 302, B 304, C 306, D 308, E 310, F 312, G 314, and H 316. Nodes B 304 and C 306 both depend from node A 302, and node F 312 depends on node C 306. Node E 310 depends on node D 308 and node G 314 depends on node E 310. Finally, node H 316 depends on both nodes F 312 and G 314.

The example data flow graph 300 may represent an optimal execution order for the operations represented by the nodes. For example, the data flow graph 300 indicates that some operations may be executable in parallel. For example, it may be possible for the operations of nodes A 302 and D 308 to be executed at the same time, because the operations at these nodes are not dependent on one another. Similarly, it may be possible for the operations of nodes B 304, C 306, and E 310 to be performed at the same time.

When the available resources of the integrated circuit device are considered, however, it may become apparent that the device may not be able to perform the operations of some of the nodes at the same time. In various examples, the scheduler component of the compiler can apply resource availability to the data flow graph 300, and, based on the resource availability, can determine an order in which the operations of each node a can be performed.

To determine a schedule for the operations at the nodes of the data flow graph 300, the scheduler can also consider the amount of time, measured in seconds or clock cycles or another denomination, the operations at each node may take. By considering the time that may be required to perform the operations at each node, the scheduler can determine a schedule that can attempt to make optimal use of the resources of the integrated circuit device.

Figure 3B:
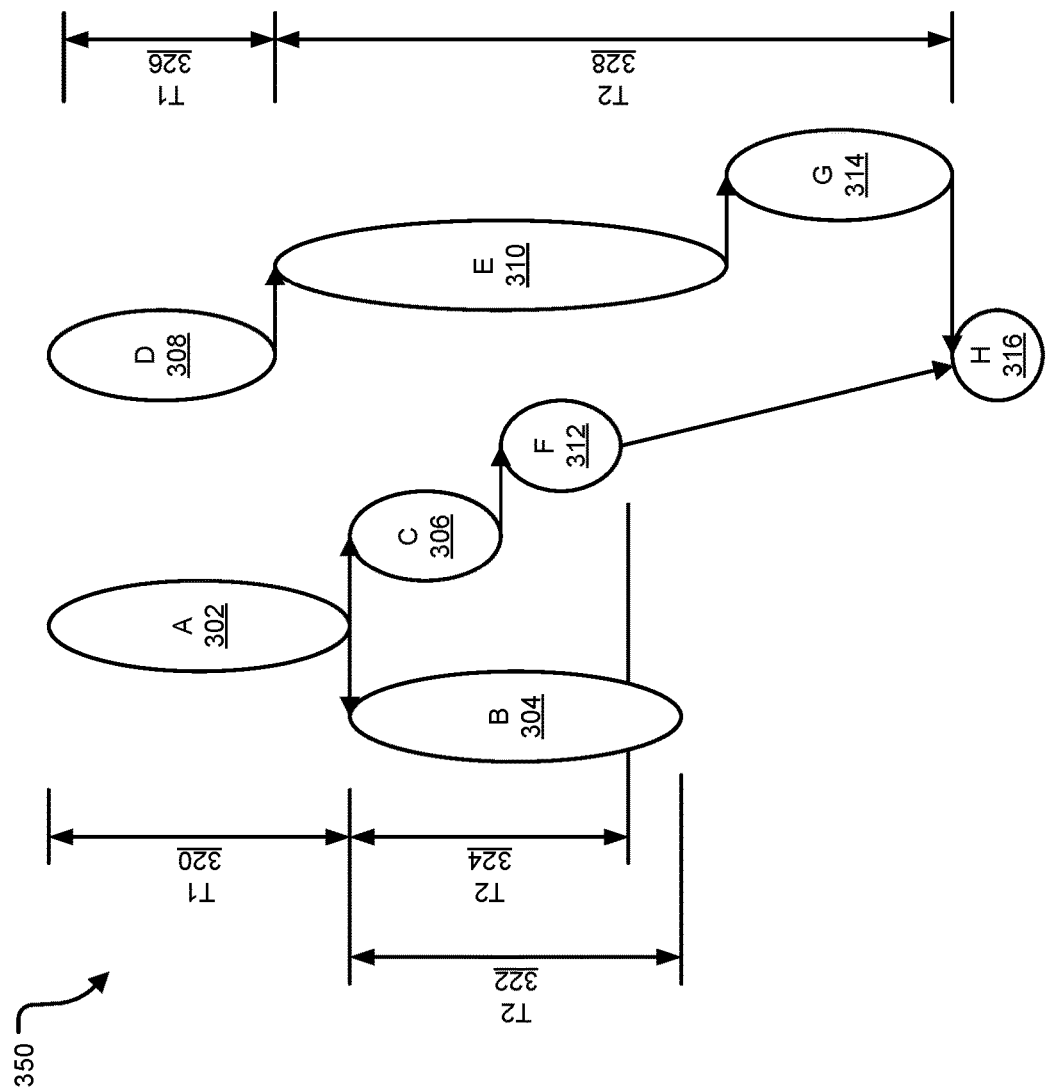

FIG. 3B includes a drawing of a time-aware version of the data flow graph 300 of FIG. 3A. The data flow graph 350 of FIG. 3B represents the amount of time required to perform the operations at each node by the relative size of the nodes. For example, nodes that are longer, vertically, require more time to complete than nodes that are shorter. To estimate the amount of time the integrated circuit device may need to complete the operations at each node, the scheduler can use equations such as are discussed above. An estimated time can be associated with each node, for example as additional data or an additional variable in a data structure that describes each node. The example data flow graph 350 also illustrates, using horizontal arrows, that operations of a dependent node can begin as soon as the operations at the node that is depended from end.

Using the data flow graph 350, the scheduler can perform a process for scheduling the operations at each of the nodes. The process can begin by identifying a first set of nodes that have no dependencies, and whose operations will use a same resource of the integrated circuit device. In the example of FIG. 3B, the first set of nodes can include nodes A 302 and D 308. These nodes may, for example, represent copying of data into the integrated circuit device, and both may be performed by a DMA engine of the integrated circuit device. In this example, because the operations at both nodes A 302 and D 308 are to be performed by the same DMA engine, the scheduler needs to determine which node's operations should be performed first.

To determine which of nodes A 302 or D 308 to schedule first, the scheduler can consider the estimated execution time of these nodes (illustrated as T1 320 and T1 326, respectively), as well as an estimated execution time for dependent nodes of these nodes. The dependent nodes can form a chain or sequence of nodes that depended on one another and on (at this stage of the analysis) nodes A 302 or D 308. For example, node B 304 is a set of dependent nodes to node A 302 that includes just node B 304. The estimated execution time for this set of dependent nodes is estimated execution time of node B 304, illustrated as T2 322. As another example, nodes C 306, 312, and H 316 are a second set of dependent nodes to node A 302; however, the depth or number of dependent nodes being considered by the scheduler is limited, in this example, to two nodes. The limit may be placed to balance the accuracy of the scheduler, which can approach near perfect if the limit is set to infinity or the maximum depth of the data flow graph 350, and performance of the compiler, which may need a large amount of memory and a long time to run when the limit is set to a high number. The limit may be input to the compiler as a run-time option.

With a depth limit of two imposed, the estimated execution time for second set of dependent nodes to node A 302 includes the estimated execution times of nodes C 306 and F 312, illustrated as T2 324.

The dependent nodes to node D 308, at a depth limit of two, includes nodes E 310 and G 314, that together have an estimated execution time illustrated as T2 328.

The scheduler next can identify, from among nodes A 302 and D 308, the node that has the shortest execution time, and that has a set of dependent nodes with the longest execution time. In the example of FIG. 3B, T1 326 of node D 308 is less than T1 320 of node A 302, and T2 328 of the dependent nodes of node D 308 is longer than either T2 322 or T2 324 of the dependent nodes of node A 302. Thus, the scheduler may determine to schedule the operations of node D 308 first, and the operations of node A 302 second.

Considering dependent nodes, up to a limit, can enable more efficient scheduling of the operations represented by the nodes. For example, the operations of nodes B 304, C 306, and E 310 may each include operations to be performed by a computation engine. In this example, scheduling the operations of node D 308 first can enable the computation engine to being working on the operations of node E 310. While the computation engine is working on the operations of node E 310, the operations of node A 302 can be performed, and may be completed by the time the computation engine is done with the operations of node E 310. The computation engine may thus be able to start on the operations of nodes B 304 or C 306 without needing to wait for the operations of node A 302 to be completed.

Figure 3C:
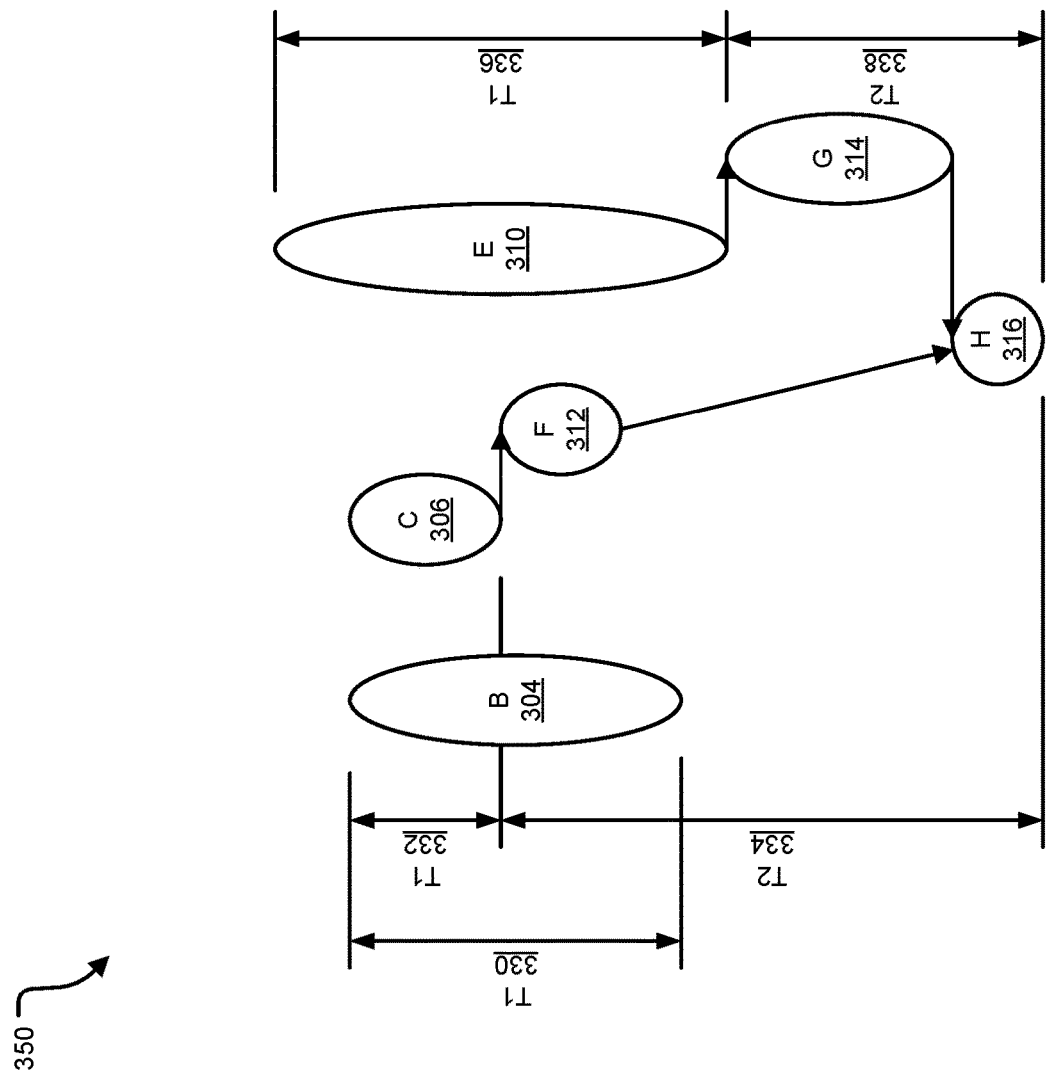

Having scheduled the operations of nodes A 302 and D 308, the scheduler can now remove these nodes from the data flow graph 350, and repeat the process for the remaining nodes. FIG. 3C includes a drawing of the data flow graph 350 once nodes A 302 and D 308 have been removed. The next set of nodes to be considered are now nodes B 304, C 306, and E 310, which, with nodes A 302 and D 308, are no longer dependent on any other nodes. The estimated execution times of nodes B 304, C 306, and E 310 are illustrated as T1 330, T1 332, and T1 336, respectively. Additionally, the estimated execution time for the dependent nodes of node C 306 (nodes F 312 and H 316) is illustrated as T2 334, and the estimated execution time for the dependent nodes of E 310 (nodes G 314 and H 316) is illustrated as T2 338.

In the example of FIG. 3C, it may be that the operations of nodes B 304, C 306, and E 310 will each make use of the same resource. For example, these operations may each be performed by the same computation engine. The scheduler may determine to schedule the operations of node C 306 first, due to node C 306 having the shortest estimated execution time (T1 332) from among nodes B 304, C 306, and E 310, and having a set of dependent nodes that has the longest estimated execution time (T2 334). This would enable the operations of node F 312 to begin while the operations at nodes B 304 or E 310 are also being executed.

Between nodes B 304 and E 310, node B 304 has a shorter estimated execution time (T1 330) than does node E 310 (T1 336), but node E 310 has dependent nodes with a longer estimated execution time (T2 338) because node B 304 has no dependent nodes, and thus the estimated execution time of the dependent nodes of B 304 is zero. Scheduling the operations of node E 310 before the operations of node B 304 can enabled the operations of node G 314 to begin, and for the operations of node H 316 to not have to wait for the operations of node B 304 to complete. Additionally, when the operations of nodes F 312 and G 314 are to be performed by a different execution engine than the execution engine that is to perform the operations of nodes B 304, C 306, and E 310, execution of the operation of nodes F 312 and G 314 can begin while the operations of node B 304 are in progress.

Figure 3D:
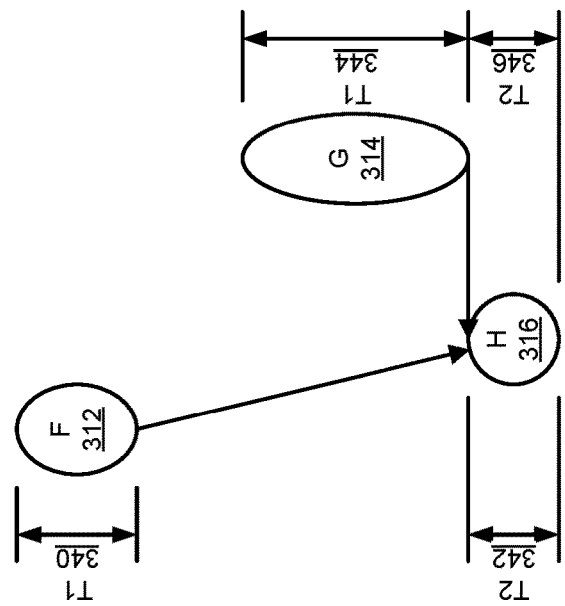

FIG. 3D includes a drawing of the data flow graph 350 once nodes B 304, C 306, and E 310 have been removed from consideration. The next set of nodes considered by the scheduler are now nodes F 312 and G 314, which may include operations that are to be performed by a same execution engine. As indicated by estimated time T1 340 for node F 312 and T1 344 for node G 314, the operations of these nodes take different amounts of time to execute, but both nodes F 312 and G 314 have the same dependent node, node H 316. Thus, because the estimated execution time for the dependent nodes of each node (T2 342, and T2 346) is the same, the scheduler make use other factors when determining which node's operations to schedule first. For example, the scheduler may schedule the operations of node F 312 first because these operations are expected to be completed in a shorter time than the operations of node G 314. As another example, the scheduler may schedule the operations of node G 314 first because these operations are expected to take longer to complete.

Using a process such as has been described above, the compiler's scheduler can use estimated execution times for various operations to determine a schedule that attempts to keep each execution engine of an integrated circuit device fully occupied.

In various examples, the scheduler may also need to consider the limited amount of resources that an integrated circuit device may have. For example, the device's local memory may be too small to store all of the input data needed by a computation. Additionally, the device may not have hardware that can determine when data in the local memory can be overwritten.

In these and other examples, the compiler can resolve issues of resource contention between the operations that the integrated circuit device is to perform. For the local memory, compiler may, for example, be able to track free and used regions of the memory, and may be able to assign the memory addresses that data movement operations are to use. When the memory is fully occupied, the compiler can further apply procedures to determine which data can be overwritten with new data. For example, the compiler can use a first in, first out technique, in which the oldest data is always the first to be overwritten. Such an approach, however, which does not consider the amount of time needed to copy data into or out of the memory, and the potential time penalty should the data need to be copied into the memory again.

Figure 4A:
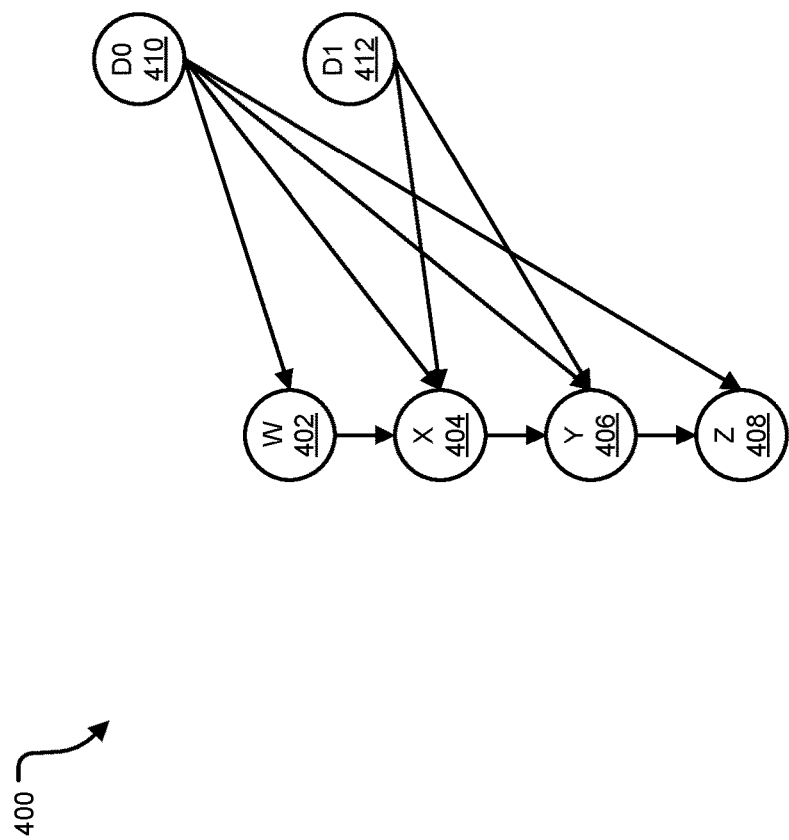
FIGS. 4A-4C illustrate example graphs with nodes indicating data used as inputs to the operations at the nodes of the graphs.
Figure 4C:
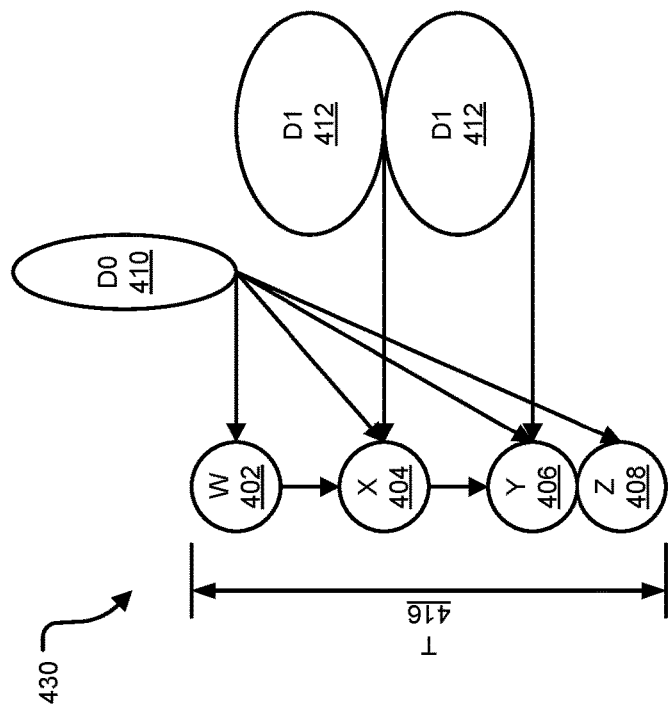
Figure 4B:
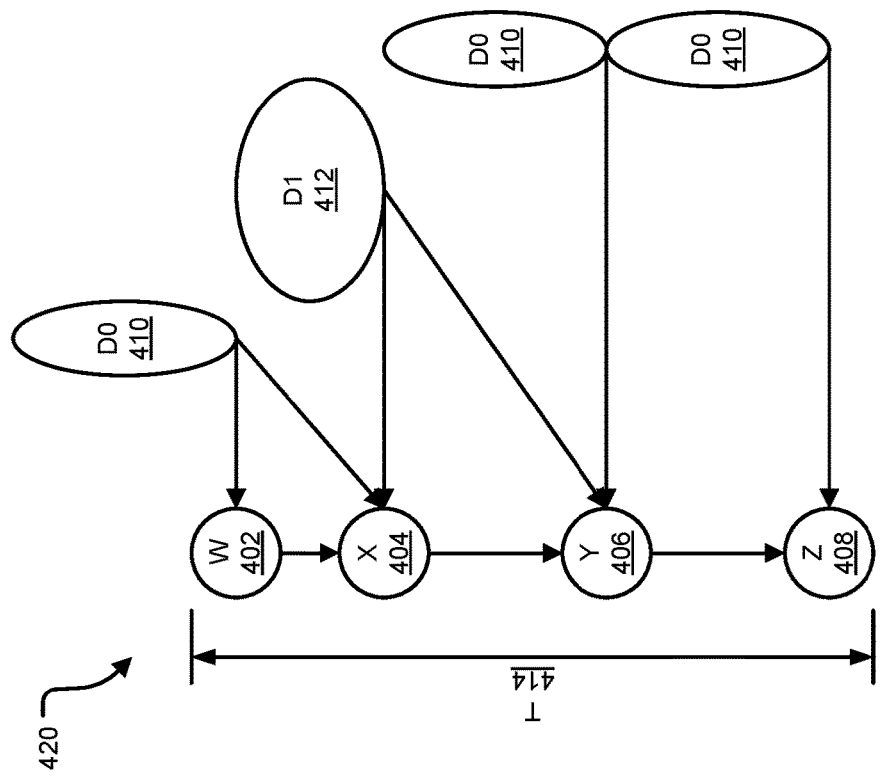

FIGS. 4A-4C illustrate example graphs with nodes indicating data used as inputs to the operations at the nodes of the graphs. FIGS. 4A-4C further illustrate an analysis that the compiler's scheduler may perform in determining which data should be kept in the local memory of the integrated circuit device and which can be overwritten.

FIG. 4A includes a drawing of an example graph 400, with the input data for the nodes of the graph 400 indicated. The example graph 400 includes four nodes, labeled W 402, X 404, Y 406, and Z 408. In this example, node X 404 depends on node W 402, node Y 406 depends on node X 404, and node Z 408 depends on node Y 406. Additionally, the scheduler may determine, based on these dependencies, that the operations of these four nodes will be performed one after the other.

In the example of FIG. 4A, the operations at node W 402 operation on a block of data, D0 410. Data D0 410 may thus be loaded into the memory of the integrated circuit device in a step preceding node W 402, which is not illustrated here. The graph 400 further indicates that data D0 410 will also be used as an input for the operations of each of the remaining three nodes. Another block of data, D1 412, is also used as an input for the operations at nodes X 404 and Y 406. In this example, data D1 412 would be loaded after data D0 410, since D1 412 is needed later.

In some cases, it may be that D0 410 and D1 412 together are too large to be stored at the same time in the local memory of the integrated circuit device. The compiler may thus need to determine which data should be kept in the local memory, and which can be reloaded when the data is needed for later operations.

An example approach is illustrated in FIG. 4B. In the example of FIG. 4B, data D0 410 is loaded first and is thus available as an input to the operations at node W 402 and X 404. Some or all of D0 410 can then be removed or allowed to be overwritten by D1 412 when D1 412 is loaded for the operations at node X 404. D1 412 is then available in the memory to be used as an input for the operations of node Y 406. Since D0 410 is also used as an input to the operations of node Y 406, thus will need to be reloaded. When D0 410 is reloaded, however, it may be that D1 412 cannot be removed from the local memory. For example, all of D1 412 may need to be available for the duration of computations performed at X 404. In this and other examples, the data of D0 410 may be copied into the local memory in segments, such that all of D0 410 is not present at the same time in the local memory. Instead, the segments of D0 410 are allowed to be overwritten once sufficient time has passed for each segment to be read by the execution engine performing the operations of node Y 406.

Data D0 410 is also used as an input to the operations at Z 408. D0 410 thus needs to be reloaded again for node Z 408. In this case, D1 412 may be overwritten if it is determined that D1 412 is no longer needed. Otherwise, D0 410 may again be loaded in segments.

The graph 420 of FIG. 4B, however, illustrates a time penalty that may result from repeatedly reloading data D0 410. In the graph 420 of FIG. 4B, the shape of the nodes for D0 410 and D1 412 reflect the size of the data as well as an estimate of the amount of time needed to copy the data into the local memory. The size of the data is indicated by the width of the nodes, and the estimated amount of time to copy the data into the local memory is indicated by a height of the nodes. As illustrated in this example, D0 410 includes a smaller amount of data than does D1 412, and D0 410 requires more time to be loaded than does D1 412.

The graph 420 further illustrates a time T 414 for the nodes W 402 through Z 408 to be executed. In this example, T 414 includes the estimated time for performing the operations at each of the nodes, plus the time to load D1 412, and the time to load D0 410 twice. As illustrated by time T 414, because the example of FIG. 4B does not take into account the estimated time required to load the data, T 414 primarily includes the time for reloading data D0 410.

In various examples, the compiler's scheduler can examine data usage by the nodes in a data flow graph, the size of the data that is used, and an estimate of the time needed to copy the data into the memory of the integrated circuit device. For example, the dependencies from the node for data D0 410 indicate that D0 410 will be used multiple times between nodes W 402 to Z 408. In other example, D0 410 be used even more times in a sequence of dependent nodes; thus, in some examples, the scheduler may have a configurable limit (which may be provided as a runtime option) for the number of nodes in a sequence of dependent nodes that the scheduler considers. As a further example, descriptions of the data, included in each node, can indicate a size of D0 410 and D1 412. Using the size and equations such as are discussed above, the scheduler can compute an estimate of the time needed to copy D0 410 and D1 412 into the device.

Once the scheduler has the number of times a block of data is needed over a sequence of nodes, the size of the block of data, and the estimate of time needed to move the data, then scheduler can then consider which order of operations may be the most efficient. Efficiency may be measured by different factors. For example, FIGS. 4B and 4C, time is considered the most important factor. In other examples, another factor, such as maximizing available space in the memory or minimizing memory bandwidth usage, may be the primary factor. In the examples of FIGS. 4B and 4C, the scheduler may be configured to minimize the amount of time execution engines of the integrated circuit device are idle while waiting for data. Thus, the scheduler may conclude that, because D0 410 is used more times and takes more time to load, that D0 410 should be kept in the memory while D1 412 is reloaded when this data is needed.

FIG. 4C illustrates a graph 430 that results from this analysis. In this graph 430, D0 410 is not overwritten when D1 412 is loaded to be used as an input to the operations at node X 404. The scheduler, by looking ahead, can determine that D0 410 should be kept in memory so that D0 410 is available for later operations. Thus, D1 412 is loaded in segments, so that D1 412 uses the space that is left while D0 410 is in the memory, and all of D1 412 is not present in the memory at one time. When the operations of node Y 406 start, D0 410 will be in the memory, and D1 412 will need to be reloaded. Because D0 410 is still needed for the operations at node Z 408, the scheduler will again determine to keep D0 410 in the memory. When the operations at node Z 408 no reloading of data will be needed.

The time T 416 for executing nodes W 402 through Z 408 according to the graph 430 of FIG. 4C, includes the time to execute the operations of each node, plus the time to load D1 412 twice. As illustrated here, T 416 is shorter than T 414, and the execution engine performing the operations of nodes W 402 trough Z 408 spend less time waiting for data to be loaded.

In some examples, to determine whether to use the sequence illustrated by the graph 420 of FIG. 4B or the sequence illustrated by the graph 430 of FIG. 4C, the compiler can generate both graphs, compute the time each would take to execute, and then use the computed time to select which graph to use to generate a schedule. The compiler can, for example, have a configuration setting that instructs the scheduler, in certain situations, to speculatively try more than one schedule for a given set of operations. The compiler can further have a configuration setting that instructs the scheduler as to how many nodes to look ahead, which may be a numerical limit or which may be a limit determined by relationships between the nodes.

In the example of FIGS. 4B and 4C, the compiler can be triggered to generate speculative schedules upon determining that the operations at node X 404 require two pieces of data that do not both fit in the available memory space. In other examples, other conditions can trigger generation of speculative schedules. Also in the example of FIGS. 4B and 4C, the compiler may stop looking ahead at node Z 408 based on node Z 408 being the last node that uses data D0 410. Alternatively or additionally, the compiler may stop at node Z 408 due to four being set as the limit on how many nodes to look ahead. Once the compiler has determined schedules based on both graphs of FIGS. 4B and 4C, the compiler can compute times the execution times of these schedules, and can select the graph 430 of FIG. 4C as the schedule to use.

FIG. 5 includes a flowchart illustrating an example of a process 500 for generating program instructions for an integrated circuit device. The process 500 may be implemented by, for example, a compiler. The compiler can be executed by a computing device that includes one or more processors and a memory for storing instructions comprising the compiler. The instructions, when executed by the one or more processors, can cause the processor to perform operations including executing the steps of the process 500. The instructions for the compiler can further be stored on a non-transitory computer-readable medium.

At step 502, the process 500 includes receiving an input data set including operations to be performed by an integrated circuit device and dependencies between the operations. In some examples, the input data set may be organized in a graph, where nodes in the graph represent operations to be performed by the integrated circuit device and connections between the nodes represent dependencies between the nodes. As an example, a later node is dependent on a prior node when operations represented by the prior node need to be executed by the integrated circuit device before the integrated circuit device can start executing operations represented by the later node.

In some examples, the integrated circuit device does not include features for performing memory management. For example, the integrated circuit device might lack logic for tracking the age of data stored in an onboard memory, and/or for determine which data can be overwritten when space is needed for new data.

At step 504, the process 500 includes computing an estimated execution time for each operation in the input data set, where the estimated execution time is based on a model of a respective resource to be used in execution of each operation. To compute the estimated execution times, the compiler can be configured with equations that model the operation of the hardware that will execute the operations. For example, the compiler can include a model for a DMA engine and each of the different execution engines of the integrated circuit device. In some examples, the estimated execution time for each operation is included in the data set received at step 502. For example, the estimated execution times can be computed in advance, by another process, which can add the estimated execution times to the input data set. In this examples, step 504 can be omitted.

At step 506, the process 500 includes determining a first set of operations in the input data set that are not dependent on other operations in the input data set, where the first set of operations will each use a same resource of the integrated circuit device. The first set of operations can include, for example, the operations at a first node and a second node of the graph, where these nodes are not dependent on other nodes and the nodes represent operations to be performed by the same execution engine of the integrated circuit device. Because the operations of the first node and the second node are to be performed by the same execution engine, the compiler can determine which node's operations to perform first, and which to perform second.

At step 508, the process 500 includes determining, for each operation of the first set of operations, an estimated execution time of a respective set of dependent operations that depend from each operation, where a number of operations in each respective set of dependent operations is less than or equal to a pre-determined limit. For example, for the first node, the compiler can determine a first estimated execution time of a first sequential set of nodes that depend from the first node. The first sequential set of nodes are "sequential" in that each node depends from another in the sequence (and possibly from other nodes), and the nodes each depend, directly or indirectly from the first node. As a further example, the compiler can also determine, for the second node, a second estimated execution time of a second sequential set of nodes that depend from the second node. In each of these examples, a number of nodes in the sequential set of nodes may be less than or equal to the pre-determined limit. The limit, which may be a runtime option for a compiler, will be greater than zero and less than a maximum possible value, where the maximum value is at least the maximum number of sequential nodes in the graph.

At step 510, the process 500 includes determining a first operation from the first set of operations that has a shortest estimated execution time from among the first set of operations and which has a respective set of dependent operations that has a longest estimated execution time from among the respective sets of dependent operations. Continuing the previous example, the compiler can determine that the estimated execution time associated with the first node is less than or equal to the estimated execution time associated the second node. The compiler can further determine that the first estimated execution time of the first sequential set of nodes is longer than the second estimated execution time of the second sequential set of nodes.

At step 512, the process 500 includes adding the first operation to a schedule of operations for the integrated circuit device. Continuing with the previous example, the compiler can further add the operations of the second node to the schedule of operations, after the first operation (e.g., the operations of the first node).

At step 514, the process 500 includes generating program instructions according to the schedule of operations. Generating the program instructions can include, for each node in the schedule, generating one or more instructions for the operations of the node, where the instructions will be executed by an execution engine of the integrated circuit device.

In some examples, the process 500 can further include removing the first operation from the input data set. In these examples, when the first operation is removed, a particular operation that depends on the first operation is considered no longer dependent on the first operation. In these examples, the compiler can now treat nodes that had dependencies as not having dependencies, and can perform scheduling for these nodes.

In some examples, the process 500 can further include adding a second operation from the first set of operations to the schedule of operations for execution after the first operation. The second operation may be added because an estimated execution time of the second operation is less than the estimated execution times of the remaining operations in the first set of operations, and the estimated execution time of a set of dependent operations that depend from the second operation is greater than the estimated execution time for sets of dependent operations for the other operations in the first set of operations. Alternatively, the second operation may be the last of the first set of operations.

In some examples, the process 500 can further include determining, when each operation from the first set of operations has been added to the schedule of operations, a second set of operations that use the same resource of the integrated circuit device. In these examples, the process 500 can further include determining, for each operation of the second set of operations, an estimated execution time of a second respective set of dependent operations that depend from each operation. The process 500 can further include determining a second operation from the second set of operations that has a shortest estimated execution time from among the second set of operations and which has a respective set of dependent operations that has a longest execution time from among the second respective sets of dependent operations. The process 500 can further include adding the second operation to the schedule of operations.

In some examples, the process 500 can further include determining that the first operation includes copying of first data into a memory of the integrated circuit device. In these examples, an estimated execution time for the first operation can include an estimated amount of time required to perform the copying. Additionally, in these examples, the process 500 can include identifying a region of the memory into which to copy the first data. The process 500 can also include associating the first operation with the region of the memory, such that, when a set of program instructions for the first operation are generated, the set of program instructions include an address associated with the region of the memory.

In some cases, the region of the memory may include second data that is not needed by the integrated circuit device when the first set of operations is to be executed. In these cases, the second data can be overwritten with the first data. In some cases, the process 500 further includes determining that the region of the memory is smaller than a size of the first data. In these cases, adding the first operation to the schedule of operations includes adding a series of operations for copying the first data into the region of the memory in segments. In some cases, the process 500 further includes labeling the region of the memory as available after execution by the integrated circuit device of a particular operation that uses the first data. The compiler may maintain a mapping of the memory of the integrated circuit device, and in this mapping keep track of occupied and available spaces. The region of the memory can thus be labeled as available based on a particular estimated execution time for first operation being less than a threshold. The threshold may be a configurable value, and/or may be relative the estimated execution time of other operations. For example, the threshold may be set at the shortest estimated execution time from among a set of operations that load data into the memory.

In some cases, identifying the region of the memory includes determining that second data that will be in the memory when the first operation is executed should not be removed from the memory. In these cases, the process 500 can include determining not to remove the second data based on a particular estimated execution time for copying the second data into the memory being greater than a threshold. The threshold may be a configurable value, and/or may be relative to the estimated execution times of other copy operations.

In some examples, the process 500 can further include determining that the first operation includes execution of a computation by an execution engine of the integrated circuit device. For example, the first operation can instruct an array of processing engines to perform a computation. In these examples, the array of processing engines can be configurable to execute systolic array computations. Additionally, in these examples, the process 500 can include, labeling a region of a memory that is to include input data for the execution engine as unavailable for a duration including a particular estimated execution time for the first operation. In some cases, the process 500 can further include assigning a region of a memory of the integrated circuit device for receiving results of the computation.

In some examples, the process 500 can further include adding a second operation to the schedule of operations, where the second operation depends on the first operation. The second operation may use a different resource than the first operation.

In some examples, the integrated circuit device includes multiple execution engines for executing the program instructions. In these examples, the compiler can generate more than one schedule of operation, such that the schedule of operations is one of multiple schedules of operations for each of the multiple execution engines.

In some examples, the process 500 can further include determining a first schedule of operations for operations of the first set of operations, and determining, using an estimated execution time for each operation of the first set of operations, a first total estimated execution time for the first schedule of operations. The process 500 can further include determining a second schedule of operations for the operations of the first set of operations, where the second schedule of operations schedules the operations of the first set of operations in a different order than does the first schedule of operations. The process 500 can further include determining, using an estimated execution time for each operation of the first set of operations, a second total estimated execution time for the second schedule of operations. The first schedule and the second schedule of this example are each possible schedules that can be performed by the integrated circuit device, and can have different overall execution times. Thus, for example, the process 500 can include selecting the first schedule of operations as the schedule of operations used to generate the program instructions, where the first schedule is selected based on the first total estimated execution time being less than the second total estimated execution time.

Figure 6:
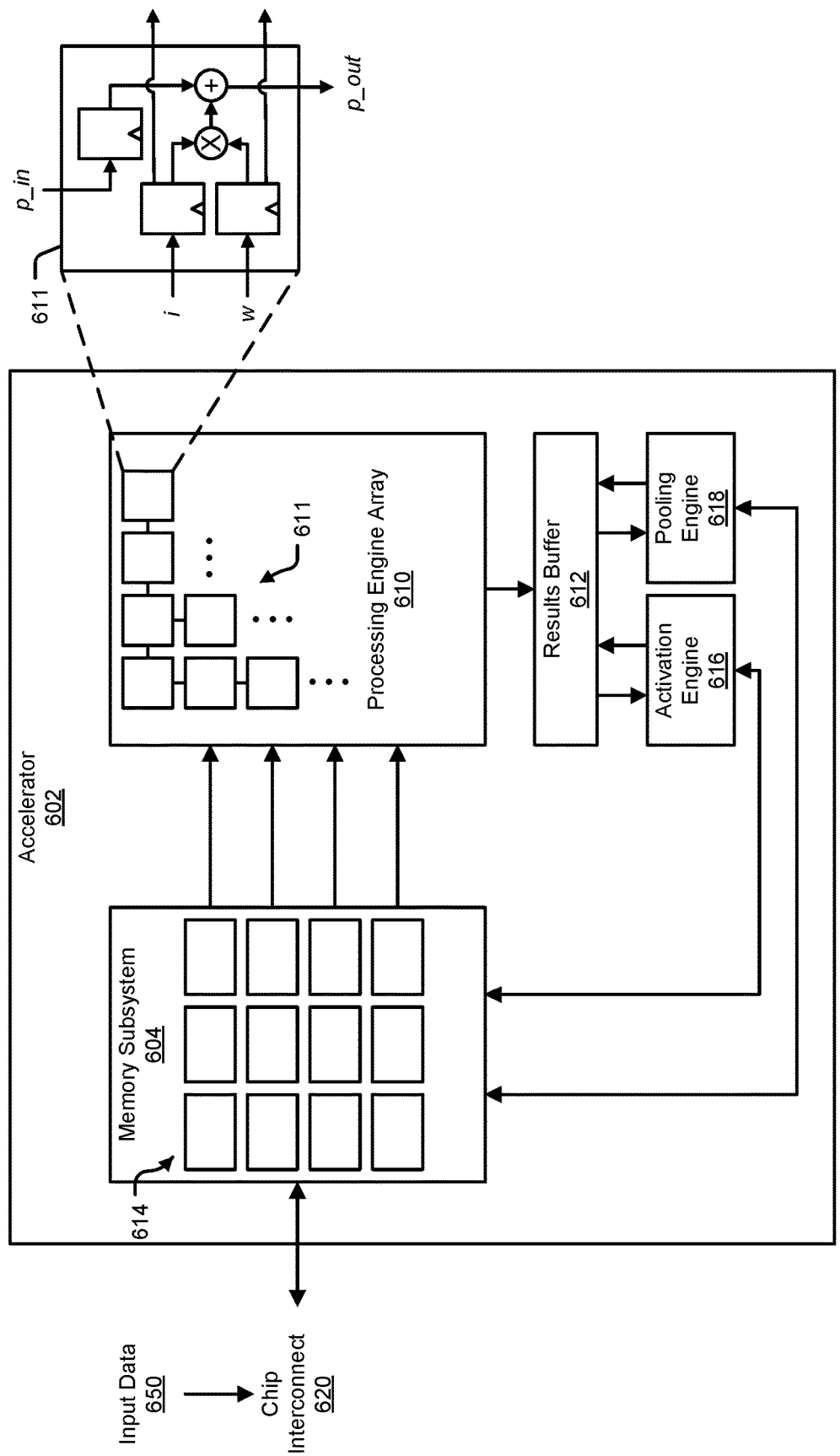
FIG. 6 is a block diagram illustrating an example of an integrated circuit device.

FIG. 6 is a block diagram illustrating an example of an integrated circuit device. In various examples, a compiler such as is discussed above can be used to generate program code that can be executed by the example integrated circuit device. The example of FIG. 6 illustrates an accelerator engine 602. In various examples, the accelerator engine 602, for a set of input data (e.g., input data 650), can execute computations using a processing engine array 610, an activation engine 616, and/or a pooling engine 618. In some examples, the example accelerator engine 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients.

For example, a set of memory banks 614 can be hardwired to provide values to the rows of the processing engine array 610, with one memory bank servicing each row. As another example, a set of memory banks can be hired wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p_in, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
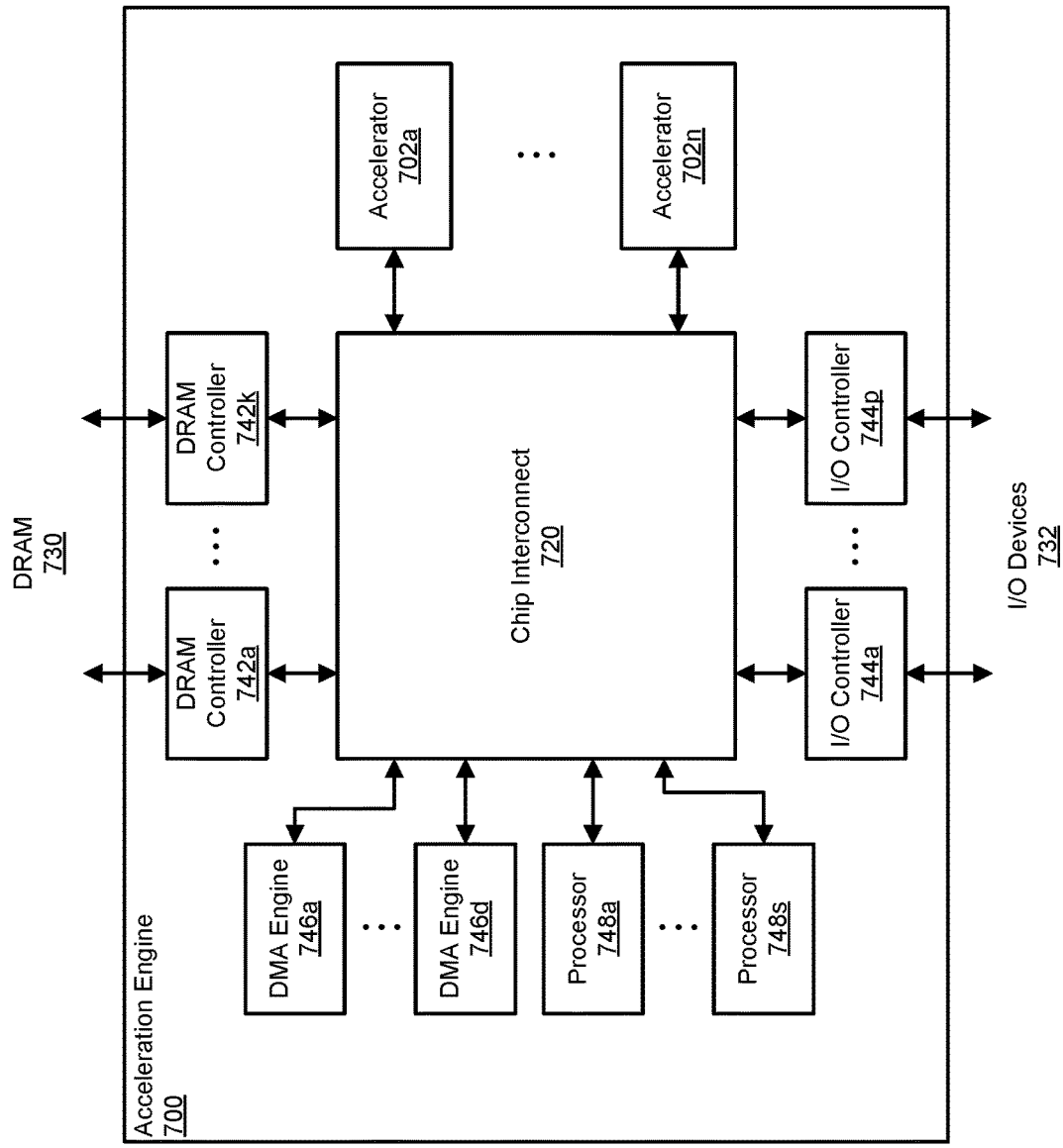
FIG. 7 includes a block diagram that illustrates an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into (e.g., on the same silicon die) the device. In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d is determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
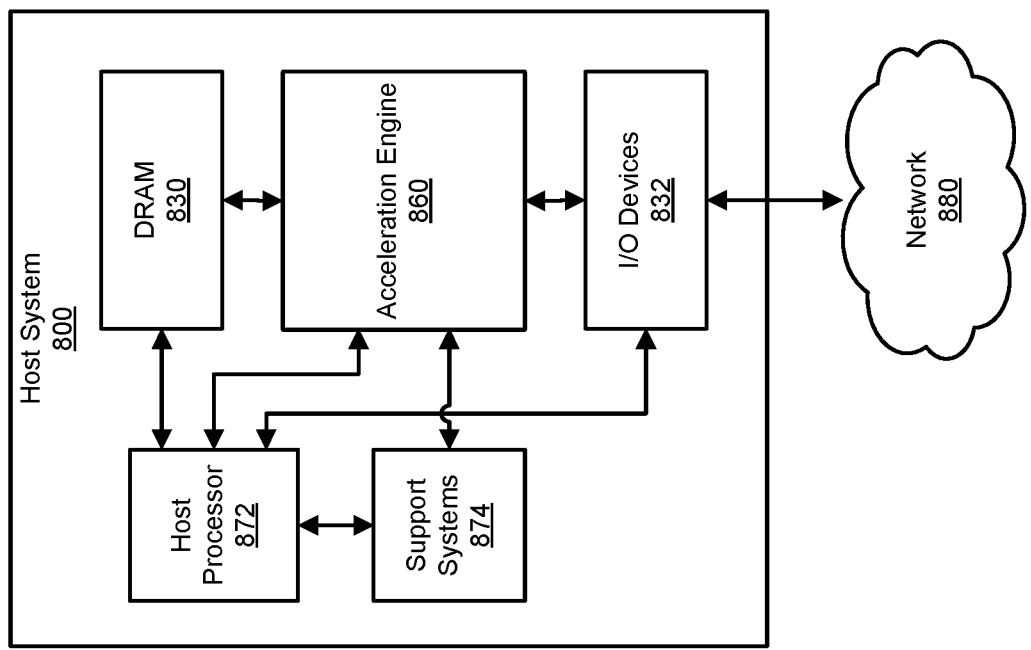
FIG. 8 includes a block diagram that illustrates an example of a host system.

FIG. 8 includes a block diagram that illustrates an example of a host system 800 in which an acceleration engine 860 can be used. The acceleration engine 860 of FIG. 8 is an example of a device that can include one or more accelerator engines such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For the example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
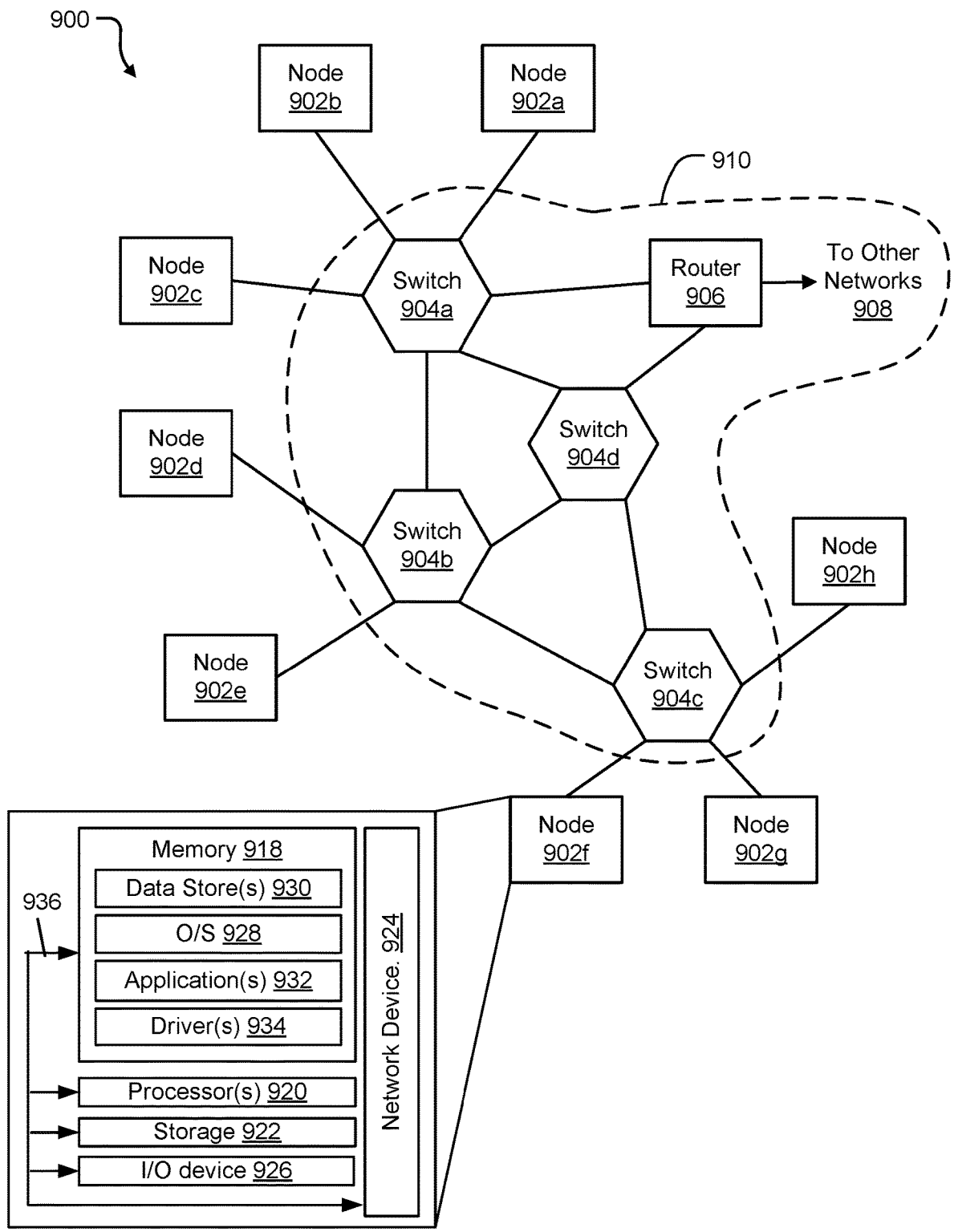
FIG. 9 includes a diagram of an example network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for generating program instructions for an integrated circuit device, comprising:

compiling, at a computing device, input codes to generate an input data set organized in a first graph, wherein nodes in the first graph represent operations to be executed by the integrated circuit device, wherein connections between the nodes represent dependencies between the nodes, and wherein a later node is dependent on a prior node when operations represented by the prior node needs to be executed by the integrated circuit device before the integrated circuit device can start executing operations represented by the later node;

computing, for each node in the first graph, an estimated execution time for respective operations represented by the node, wherein the estimated execution time is based on accessing, in a memory, a model of an execution engine that is to execute the operations and a size of data on which the operations are to be executed;

identifying a first node and a second node in the input data set that are not dependent on any other nodes and that represent operations that are to be executed by a same first execution engine of the integrated circuit device, wherein first operations of the first node include copying of first data into a memory of the integrated circuit device, and wherein second operations of the second node include copying of second data into the memory of the integrated circuit device;

determining, for the first node, a first estimated execution time of the first operations of the first node, and a second estimated execution time of a first sequential set of operations of a first sequential set of nodes that depend from the first node, where the first sequential set of operations are to be executed by one or more second execution engines of the integrated circuit device, and wherein a number of the first sequential set of nodes is less than or equal to a predetermined limit;

determining, for the second node, a third estimated execution time of the second operations of the second node, and a fourth estimated execution time of a second sequential set of operations of a second sequential set of nodes that depend from the second node, wherein the second sequential set of operations are to be executed by the one or more second execution engines of the integrated circuit device, and wherein a number of the second sequential set of nodes is less than or equal to the predetermined limit;

based on the first estimated execution time associated with the first node being less than or equal to the third estimated execution time associated with the second node, the second estimated execution time of the first sequential set of nodes being greater than the fourth estimated execution time of the second sequential set of nodes, and determining that the first data can be overwritten by the second data:

adding the first node to a second graph in the memory, the second graph representing a schedule of operations for the integrated circuit device, adding the second node to the second graph after the first node in the memory, such that the second operations of the second node are scheduled to be executed after the first operations of the first node, and adding at least a third node of the first sequential set of nodes to the to the second graph after the first node in the memory, such that third operations of the third node are scheduled to be executed in parallel with the second operations of the second node;

generating program instructions according to the second graph comprising the first node, the second node, and the third node by accessing the second graph in the memory, wherein instructions for operations represented by the first node are followed by instructions for operations represented by the second node, such that when the program instructions are executed by the integrated circuit device, the first execution engine executes the first operations of the first node followed by the second operations of the second node, and the one or more second execution engines executes at least some of the first sequential set of nodes in parallel with the execution of the execution of the second operations at the first execution engine; and storing the program instructions in the memory.

2. The computer-implemented method of claim 1, further comprising:

removing the first node and the second node from the input data set; and adding nodes of the first sequential set of nodes and the second sequential set of nodes to the second graph in the memory according to estimated execution times associated with the nodes in the first sequential set of nodes and the second sequential set of nodes.

3. The computer-implemented method of claim 1, wherein the first sequential set of nodes includes a series of nodes that are dependent on one another, wherein a particular node in the series of nodes is dependent on the first node.

4. The computer-implemented method of claim 1, wherein the predetermined limit is greater than zero and less than a maximum number of sequentially dependent nodes in the input data set.

5. A computer-implemented method, comprising:

compiling, at a computing device, input codes to generate an input data set including operations to be executed by an integrated circuit device and dependencies between the operations;

computing an estimated execution time for each operation in the input data set, wherein the estimated execution time is based on accessing, in a memory, a model of a respective resource to be used in execution of each operation;

determining a first set of operations in the input data set that are not dependent on other operations in the input data set, wherein the first set of operations will each use a same resource of the integrated circuit device;

determining, for each operation of the first set of operations, an estimated execution time of a respective set of dependent operations that depend from each operation, wherein a number of operations in each respective set of dependent operations is less than or equal to a pre-determined limit;

determining a first operation from the first set of operations that has a shortest estimated execution time from among the first set of operations and which has a respective set of dependent operations that has a longest estimated execution time from among the respective sets of dependent operations of the first set of operations;

adding a first node representing the first operation to a graph in the memory, the graph representing a schedule of operations for the integrated circuit device;

adding a second node representing a second operation of the first set of operations to the graph after the first node in the memory, such that the second operation is scheduled to be executed after the first operation;

adding a third node representing a third operation of a set of dependent operations of the first operation to the graph after the first node in the memory, such that the third operation is scheduled to be executed after the first operation in parallel with the second operation;

generating program instructions for the integrated circuit device according to the graph comprising the first node, the second node, and the third node by accessing the graph in the memory, such that when the integrated circuit device executes the program instructions, a first execution engine of the integrated circuit device executes the first operation followed by the second operation, and a second execution engine of the integrated circuit device executes the third operation in parallel with the execution of the second operation at the first execution engine; and storing the program instructions in the memory.

6. The computer-implemented method of claim 5, wherein the first operation includes copying of first data into a local memory of the integrated circuit device, and wherein a respective estimated execution time for the first operation comprises an estimated amount of time required to perform the copying.

7. The computer-implemented method of claim 6, further comprising:

identifying a region of the local memory into which to copy the first data; and associating the first operation with the region of the local memory, wherein, when a set of program instructions for the first operation are generated, the set of program instructions include an address associated with the region of the local memory.

8. The computer-implemented method of claim 7, wherein the region of the local memory includes second data that is not needed by the integrated circuit device when the first set of operations is to be executed.

9. The computer-implemented method of claim 7, further comprising:

determining that the region of the local memory is smaller than a size of the first data, wherein the first node represents a series of operations for copying the first data into the region of the local memory in segments.

10. The computer-implemented method of claim 7, further comprising:

labeling the region of the local memory as available after execution by the integrated circuit device of a particular operation that uses the first data, wherein the region of the local memory is labeled as available based on a particular estimated execution time for the first operation being less than a threshold.

11. The computer-implemented method of claim 7, wherein identifying the region of the local memory includes determining that second data that will be in the local memory when the first operation is executed should not be removed from the local memory, wherein determining not to remove the second data is based on a particular estimated execution time for copying the second data into the local memory being greater than a threshold.

12. The computer-implemented method of claim 5, wherein a respective estimated execution time for the first operation includes an estimated amount of time required for the first execution engine to perform the computation.

13. The computer-implemented method of claim 12, further comprising:

labeling a region of a local memory of the integrated circuit device that is to include input data for the first execution engine as unavailable for a duration including a particular estimated execution time for the first operation.

14. The computer-implemented method of claim 13, further comprising:

assigning the region of the local memory for receiving results of the computation.

15. The computer-implemented method of claim 13, wherein the first execution engine includes an array of processing engines configurable to perform systolic array computations.

16. The computer-implemented method of claim 5, further comprising:

removing the first operation from the input data set, wherein, when the first operation is removed, a particular operation that depends on the first operation is considered no longer dependent on the first operation.

17. The computer-implemented method of claim 5, further comprising:

determining, when nodes representing each operation from the first set of operations has been added to the graph in the memory, a second set of operations that use the same resource of the integrated circuit device;

determining, for each operation of the second set of operations, an estimated execution time of a second respective set of dependent operations that depend from each operation;

determining a fourth operation from the second set of operations that has a shortest estimated execution time from among the second set of operations and which has a respective set of dependent operations that has a longest execution time from among the second respective sets of dependent operations; and adding a fourth node representing the fourth operation to the graph in the memory.

18. The computer-implemented method of claim 5, further comprising:

determining a first schedule of operations for operations of the first set of operations;

determining, using an estimated execution time for each operation of the first set of operations, a first total estimated execution time for the first schedule of operations;

determining a second schedule of operations for the operations of the first set of operations, wherein the second schedule of operations schedules the operations of the first set of operations in a different order than does the first schedule of operations;

determining, using an estimated execution time for each operation of the first set of operations, a second total estimated execution time for the second schedule of operations; and selecting the first schedule of operations as the schedule of operations based on the first total estimated execution time being less than the second total estimated execution time.

19. The method of claim 5, wherein the first execution engine comprises a direct memory access (DMA) engine; and wherein the second execution engine comprises one or more arithmetic engines.

20. A non-transitory computer-readable medium having stored thereon instructions that, when executed by one or more processors, cause the one or more processors to perform operations including:

- compiling input codes to generate an input data set including operations to be executed by an integrated circuit device and dependencies between the operations;
- computing an estimated execution time for each operation in the input data set, wherein the estimated execution time is based on accessing, in a memory, a model of a respective resource to be used in execution of each operation;
- determining a first set of operations in the input data set that are not dependent on other operations in the input data set, wherein the first set of operations will each use a same resource of the integrated circuit device;
- determining, for each operation of the first set of operations, an estimated execution time of a respective set of dependent operations that depend from each operation, wherein a number of operations in each respective set of dependent operations is less than or equal to a pre-determined limit;
- determining a first operation from the first set of operations that has a shortest estimated execution time from among the first set of operations and which has a respective set of dependent operations that has a longest estimated execution time from among the respective sets of dependent operations;
- adding a first node representing the first operation to a graph in the memory, the graph representing a schedule of operations for the integrated circuit device;
- adding a second node representing a second operation of the first set of operations to the graph after the first node in the memory, such that the second operation is scheduled to be executed after the first operation;
- adding a third node representing a third operation of a set of dependent operations of the first operation to the graph after the first node in the memory, such that the third operation is scheduled to be executed after the first operation and in parallel with the second operation;
- generating program instructions for the integrated circuit device according to the graph comprising the first node, the second node, and the third node by accessing the graph in the memory, such that when the integrated circuit device executes the program instructions, a first execution engine of the integrated circuit device executes the first operation followed by the second operation, and a second execution engine of the integrated circuit device executes the third operation in parallel with the execution of the second operation at the first execution engine; and
- storing the program instructions in the memory.

* * * * *